G. C. JETT.
BEARING.
APPLICATION FILED MAR. 28, 1919.

1,383,466.

Patented July 5, 1921.
2 SHEETS—SHEET 1.

Inventor:
George C. Jett.
By W. Herbert Lowkes, Atty.

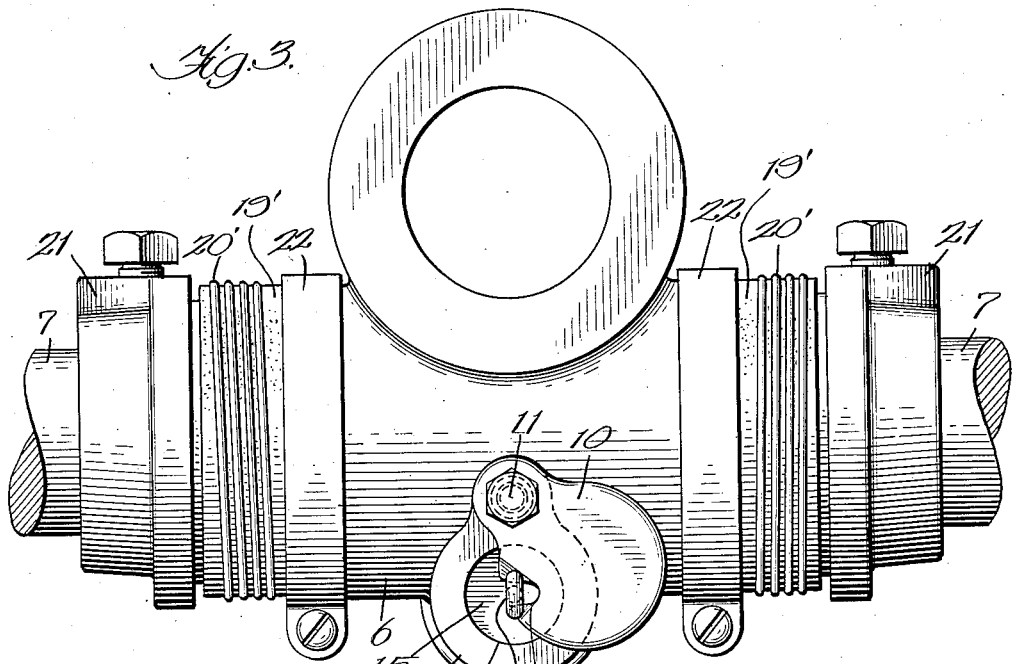
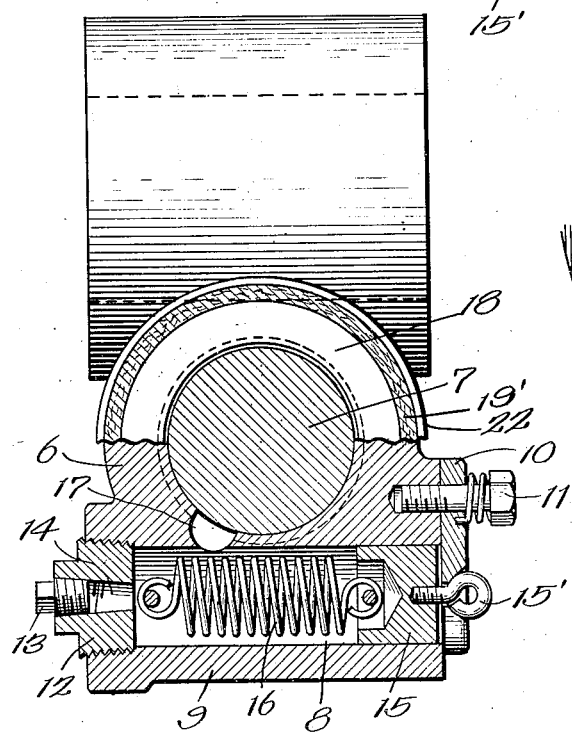
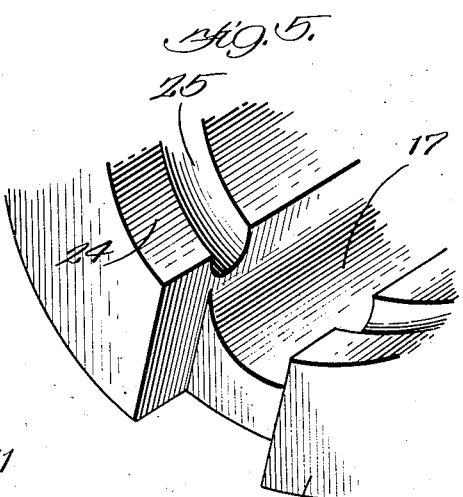

UNITED STATES PATENT OFFICE.

GEORGE C. JETT, OF MILWAUKEE, WISCONSIN, ASSIGNOR, BY MESNE ASSIGNMENTS, OF TWO-FIFTHS TO WALTER H. STIEMKE, OF MILWAUKEE, WISCONSIN.

BEARING.

1,383,466.  Specification of Letters Patent.  Patented July 5, 1921.

Application filed March 28, 1919. Serial No. 285,782.

*To all whom it may concern:*

Be it known that I, GEORGE C. JETT, a citizen of the United States, residing at Milwaukee, in the county of Milwaukee and State of Wisconsin, have invented certain new and useful Improvements in Bearings, of which the following is a specification.

My present invention relates to bearings, and has for one of its salient objects to provide the bearing housing with an integral compression grease chamber positioned in close proximity with the surface to be lubricated for the purpose of achieving effective lubrication, together with ducts constructed and arranged in said housing whereby the chamber serves as a balancing medium for the unequal pressures set up in the bearing proper; and a further object of the invention relates to the provision of a novel end packing means for the bearing peculiarly adapted for use under circumstances where a short clearance at the bearing terminals reflects a cramped condition prohibiting the use of stuffing boxes, said means being also capable of effective use with a bearing housing having a grease compression chamber, and being designed to positively exclude dirt and prevent waste of oil from the bearing, irrespective of the type of bearing employed, whether plain, roller or ball-bearing.

The invention further objectively contemplates certain novel details of construction, combination and arrangement of certain parts of the improved device, whereby to increase the efficiency and utility of devices of this character.

These together with such other advantages as may be hereinafter described, or are incident to my invention, I attain by means of a construction illustrated in preferred form in the accompanying drawings, wherein:

Fig. 3 is a view in elevation of one side of the bearing housing of Fig. 2;

Fig. 4 is a transverse sectional view through the housing centrally of the grease compression chamber; and Fig. 5 is an enlarged detailed view of an end portion of the housing.

Figure 1:
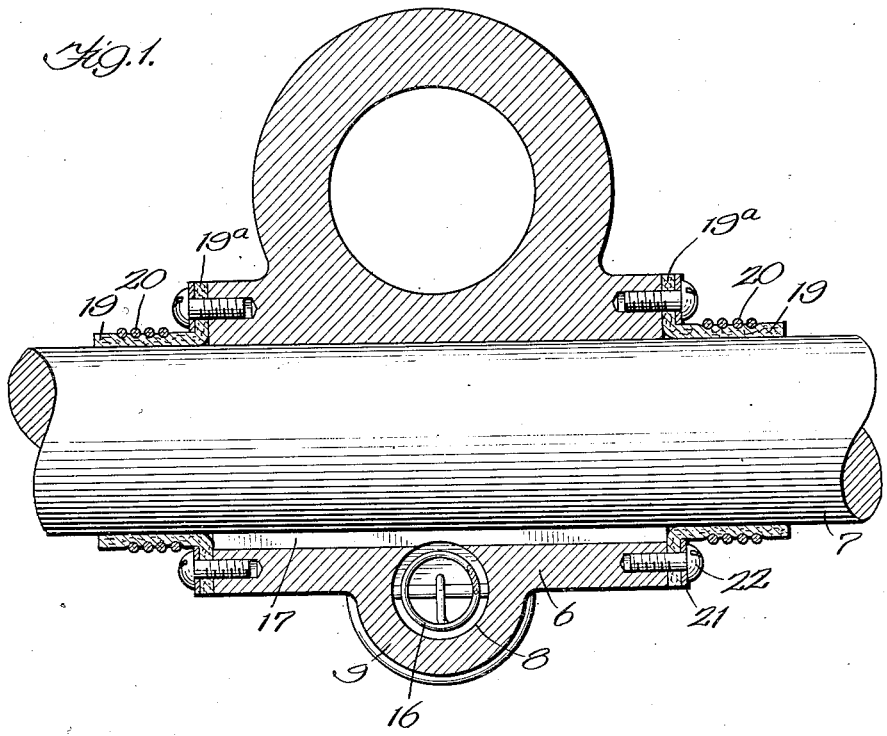
Figure 1 is a vertical longitudinal sectional view of a radial bearing to which my invention, in its simplest form, is shown applied.

In the drawings, the reference character 6 denotes the bearing housing through which extends the live shaft 7 to have a bearing therein. This bearing housing is cast to form a cylindrical grease compression chamber 8 disposed transversely of the axis of the shaft and preferably below it, the casting being centrally enlarged at 9 to accommodate the chamber. This chamber is desirably closed at one end by the swinging closure plate 10 which has its pivot at 11, and at the other end is provided with a threaded cap 12 and a plug 13 closing the tapped opening 14 in said cap through which the grease is introduced under pressure by any suitable means, as a grease gun, into the chamber. Having a sliding fit in the chamber is a plunger 15 tending normally to exert pressure upon the charge of grease by means of the tension spring 16, so as to feed it into and along the longitudinal groove 17 of the bearing toward the end packing rings. This groove is not only in direct communication with the surface to be lubricated, but also with, and in close proximity to, the chamber itself. Prior to the introduction of the charge of grease, or other lubricant, into the compression chamber, the closure plate 10 is swung open and the plunger 15 is retracted so as to engage its head 15' with the slot 10' whereby the plunger may be held in its retracted position as shown in Fig. 4. Movement of the closure plate to the right releases the plunger which immediately places the charge in the chamber under full compression. The plate may then be closed.

Referring now to Fig. 1 of the drawings, which illustrates one embodiment of my invention as applied to a radial bearing, it will be seen that I provide the shouldered ends 18 of the housing 6 with flanged packing rings whose sleeve portions 19 surround the shaft 7 near the terminals of the groove 17 and have their inner faces held in snug contact with the shaft periphery by means of the helical springs 20. The rings are made preferably of leather for low speed shafts, or of asbestos, or equivalent heat-resisting material, for high speed work, and their flanges 19ª are held tightly in engaged position against the faces of the shouldered ends of the housing by means of an annular metal ring 21 and set screws 22, as shown.

Figure 2:
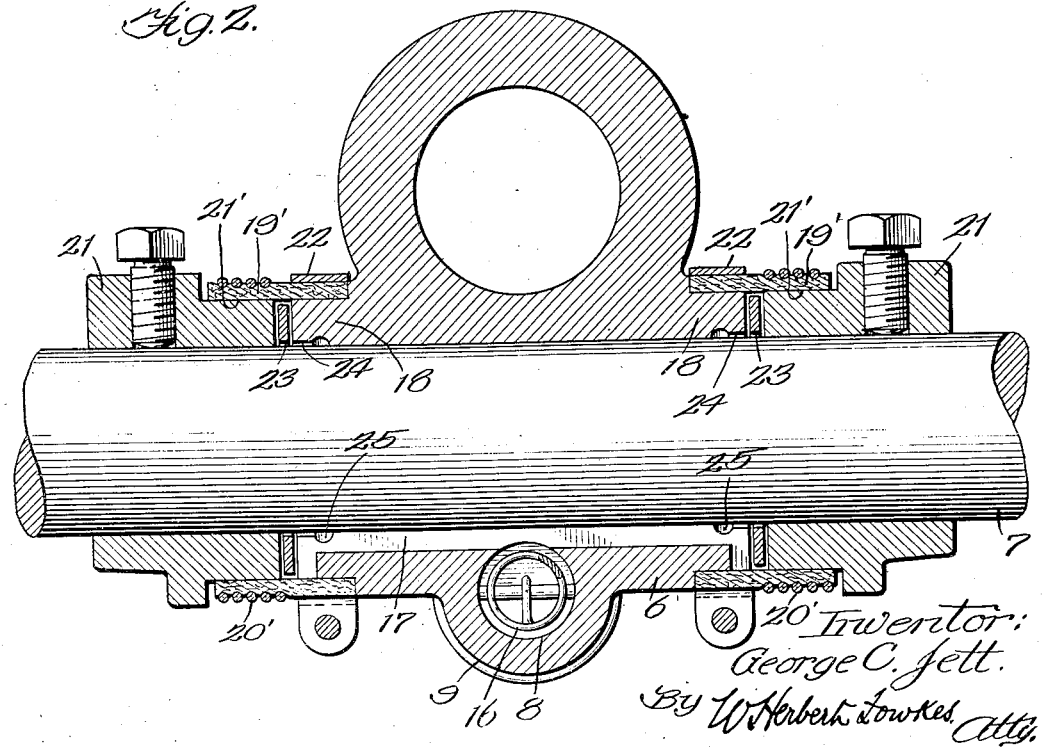
Fig. 2 represents a similar view of another embodiment of my invention employed in connection with a radial and thrust bearing.

In Fig. 2 et seq I have illustrated the preferred embodiment of my invention as exemplified in a radial and thrust bearing, and wherein the packing sleeves are designated by the reference character 19' and the helical springs by the numeral 20'. Collars 21 detachably secured to the shafts are provided, and the outer portions of the sleeves are held down snugly to the finished surfaces 21' of the collars 21 by the springs 20'', while a clamping element, as the hose clamp 22, is utilized to tightly secure each of the inner portions of the sleeve to the outer marginal portions of the housing ends 18. Obviously the collars during shaft rotation have their finished surfaces revolving within the spring-held outer portions of the sleeves, and the entire arrangement is such that foreign matter is thereby wholly excluded from the bearing proper.

One of the salient features of this present invention resides in the provision of grease ports designed to coöperate with the grease compression chamber 8 and the longitudinal groove 17 in order to overcome any suction or pumping effect which might be set up due to the snug fits of the packing sleeves on the finished surfaces of the collars during movement of the housing back and forth within the limits allowed by the running fits of thrust washers 23 between the housing ends and the collars 21. The amount of play or end-thrust of the shaft through the bearing is of a fractional quantity but nevertheless is always present, and is considered requisite in a bearing of this sort that adequate means be provided so as to allow the grease free passage, under operating conditions, from the fractional spaces around the thrust washer 23 to the grease chamber 8. Stated differently, the chamber 8 serves not only as a grease compression chamber but also as a balancing medium designed to take care of unequal pressures that may be set up in the bearing by reason of thrust under load conditions. The means above referred to will now be described.

Thrust washer 23 has its internal diameter made slightly larger than the external diameter of the shaft 7, and is formed to have its external diameter slightly less than the internal diameter of the packing sleeve 19', the clearance space between each of the washers and these stated members being provided for the purpose of permitting an avenue of escape to exist for the grease in said space when under further compression as a result of end thrust, into a clearance space or port 24 formed by boring each of the ends of the bearing slightly larger than the other and main portion of the bearing, and from thence into an annular groove 25 each of which communicates directly with the terminals of the main groove 17. It will therefore be deemed apparent that these intercommunicating grooves and ports serve not only as lubricating media proper but also as ducts which provide for movement of the grease under certain pressure conditions.

For example, assuming the shaft to be thrust under load toward the left of Fig. 2, the grease would therefore be forced out from around the right hand thrust washer 23 to flow through the grease port 24 and grooves 25 and 17 to chamber 8 or to some extent to the other end of the bearing, instead of being forced out in a thin film between the packing sleeve and collar 21 and go to waste. Opposite end thrust of the shaft would be taken care of in like manner, as will be apparent.

Another important advantage of the invention resides in the fact that the housing with its large integral grease compression chamber is reduced to the simplest possible form and at the same time achieves a maximum of efficiency in lubrication and without waste. It can be very readily and cheaply manufactured as the machine shop work thereon comes well within the capacity of standard machine shop tools. Furthermore, this construction of bearing and chamber can be practically universally applied, and particularly to bearings where cramped conditions prevail as in the instance of weight bearing wheels in tractors. The packing means disclosed has a degree of efficiency equal to that of the best make of stuffing boxes, but is formed on simpler and more economical lines of construction and on shorter dimensions. Other advantages will be apparent to those skilled in the art.

I claim:

1. A bearing housing having, in combination, a grease compression and storage chamber disposed in the body of the housing transversely of the axis of the bearing and provided in its side wall with a grease conducting groove leading directly to the bearing, together with means whereby grease may be stored in said chamber under pressure.

2. In a bearing, the combination of a bearing housing having a grease compression and storage chamber formed integrally therewith and disposed transversely of the bearing axis in close proximity to the bearing surface to be lubricated, there being a portion of the web of the housing interposed between said surface and the side wall of compression chamber, said portion formed with a lateral outlet providing communication between the chamber and the bearing and being extended in opposed directions from the chamber to constitute an elongated grease conducting groove for the bearing.

3. In a bearing, the combination of a bearing housing having a grease compression and storage chamber formed integrally therewith and disposed transversely of the bearing axis in close proximity to the bearing surface to be lubricated, there being a portion of the web of the housing interposed between said surface and the side wall of compression chamber, said portion formed with a lateral outlet providing communication between the chamber and the bearing and being extended in opposed directions from the chamber to constitute an elongated grease conducting groove for the bearing, end closure means for said chamber, and a spring operated plunger therein associated with part of said closure means and operating to force the grease through said outlet into said groove.

4. In a bearing, the combination of a bearing housing having a grease compression and storage chamber formed integrally therewith and disposed transversely of the bearing axis in close proximity to the bearing surface to be lubricated, there being a portion of the web of the housing interposed between said surface and the side wall of compression chamber, said portion formed with a lateral outlet providing communication between the chamber and the bearing and being extended in opposed directions from the chamber to constitute an elongated grease conducting groove for the bearing, end closure means for said chamber, a spring operated plunger therein associated with part of said closure means and operating to force the grease through said outlet into said groove and, flexible end packing means for said housing organized whereby it is adapted to exclude foreign matter from the bearing and to prevent the escape of the lubricant therethrough from the groove.

5. In a bearing, the combination with a shaft, of a bearing housing for said shaft integrally formed with a combined grease compression and storage chamber disposed transversely of the axis of said shaft and provided with a lateral outlet leading directly to the bearing surfaces to be lubricated.

6. In a bearing, the combination with a shaft, of a bearing housing for said shaft integrally formed therebelow with a grease compression and storage chamber disposed transversely of the axis of said shaft and provided with an upwardly directed outlet leading to the bearing surfaces to be lubricated, end closure means for said chamber, and a grease compression member normally carried by part of said means for movement in said chamber toward said other part and said outlet.

7. In a bearing, the combination with a shaft, of a bearing housing for said shaft integrally formed therebelow with a grease compression and storage chamber disposed transversely of the axis of said shaft and provided with an upwardly directed outlet leading to the bearing surfaces to be lubricated, end closure means for said chamber, and a grease compression member normally carried by part of said means for movement in said chamber toward said part and said outlet, said end closure means movable relatively of the housing and positioned at opposite sides thereof.

8. In a bearing, the combination with a shaft, of a bearing housing for said shaft integrally formed therebelow with a grease compression and storage chamber disposed transversely of the axis of said shaft and provided with an upwardly directed outlet leading to the bearing surfaces to be lubricated, end closure means for said chamber, and a grease compression member normally carried by part of said means for movement in said chamber toward said part and said outlet, said end closure means movable relatively of the housing and positioned at opposite sides thereof, the other part of said end closure means formed to engage said member during the charging of said chamber.

9. In combination, a bearing housing provided with a transverse grease compression and storage having closed ends, said chamber provided with a laterally directed outlet leading directly to the bearing surfaces to be lubricated, and a spring-operated plunger moving from one closed end to the other in the direction of said outlet whereby to force the stored grease toward and into said outlet.

10. In a bearing, the combination of a shaft, a bearing housing therefor provided with a lubricant compression and storage chamber and formed with a duct extending therefrom toward the end of said bearing, a collar fixed on said shaft and provided with a thrust member at the end of the bearing, and a closure packing device about said member, said chamber constructed and arranged with reference to said duct and said thrust member whereby to serve as a balancing medium during end thrust in the bearing.

11. In a radial and thrust bearing, the combination with a shaft, of a bearing housing therefor provided with a transverse integral grease compression chamber and formed with duct means extending therefrom to the bearing surfaces and then to the ends of said bearing, collars fixed on said shaft and each provided with a flexible thrust member at each end of the bearing in communication with said duct means, and closure packing sleeves on each of said collars and disposed to surround each of the thrust members, there being a slight clearance about said thrust members, whereby said chamber serves to forcibly feed the grease to the bearing surfaces to be lubricated and to constitute a balancing medium for the unequal pressures set up in the bearing.

12. In a bearing, the combination of a bearing housing having a grease compression and storage chamber provided with a spring operated plunger and an outlet opening toward which said plunger works, and end packing means including an inclosed thrust member having a slight clearance about it, and a grease conducting medium intermediate said clearance and said chamber whereby the chamber prevents escape of the lubricant past said end packing means.

13. In a radial and thrust bearing, the combination of a shaft provided with a collar, a bearing housing integrally formed with a grease compression chamber and provided with an inclosed thrust member loosely mounted between the housing end and the collar, the interior face of the housing formed with an annular groove leading to said thrust member and with a longitudinal groove providing communication in both directions between the annular groove and said chamber, said chamber during end thrust in the bearing constituting a balancing medium whereby to prevent escape of lubricant outwardly past said thrust member.

14. In a radial thrust bearing, the combination with a shaft provided with a collar, of a bearing housing for said shaft integrally formed with a grease compression and storage chamber disposed transversely of the bearing axis, said chamber having closed ends and an outlet leading laterally to said bearing intermediate said ends, and a spring-operated plunger in said chamber working toward said outlet, said housing provided with an annular thrust member loosely interposed between the housing end and said collar to provide a space therebetween, a spring-held fibroid sleeve inclosing said thrust member, the interior face of said housing formed with inter-communicating shaft-lubricating ducts providing communication in both directions between said space and said outlet, substantially as and for the purposes set forth.

15. A bearing comprising a housing having end closure and packing means, there being a thrust zone near one end of the bearing in which a part of said means is loosely positioned, a lubricant storage chamber in said housing, the web of said housing formed with a lubricant conducting groove leading from said chamber to said zone, and flexible means in said chamber for forcing the lubricant through said groove, the latter being substantially co-extensive with the bearing surfaces to be lubricated and said flexible means adapted to serve as a medium for balancing the thrust set up in said zone.

16. A bearing comprising a housing having end closure and packing means, there being a thrust zone in the bearing in which a part of said means is positioned, the web of said housing formed with an annular groove communicating with said zone and a longitudinal groove terminating at said annular groove, a lubricant storage chamber in said housing whose axis is angularly disposed with reference to the longitudinal groove whereby it directly communicates with said groove, and means in said chamber for forcing the lubricant into said groove and being adapted to serve as a cushioning medium in respect to the thrust set up in said zone, said part of said end closure and packing means being arranged in said zone so as to permit the return movement of excess lubricant therefrom to said annular groove when said excess is subjected to thrust.

GEORGE C. JETT.